(12) United States Patent
Glueck et al.

(10) Patent No.: US 12,560,188 B2
(45) Date of Patent: Feb. 24, 2026

(54) METHOD FOR JOINING COMPONENTS AND COMPONENT COMPOSITE

(71) Applicant: Bayerische Motoren Werke Aktiengesellschaft, Munich (DE)

(72) Inventors: Bernhard Glueck, Fuerstenfeldbruck (DE); Robert Kirschner, Olching (DE); Ulrich Schmid, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1220 days.

(21) Appl. No.: 15/869,413

(22) Filed: Jan. 12, 2018

(65) Prior Publication Data

US 2018/0135675 A1 May 17, 2018

Related U.S. Application Data

(63) Continuation of application No. PCT/EP2016/073115, filed on Sep. 28, 2016.

(30) Foreign Application Priority Data

Oct. 13, 2015 (DE) ..................... 10 2015 219 782.4

(51) Int. Cl.
*F16B 5/08* (2006.01)
*B23K 1/19* (2006.01)
(Continued)

(52) U.S. Cl.
CPC .................. *F16B 5/08* (2013.01); *B23K 1/19* (2013.01); *B23K 11/0053* (2013.01);
(Continued)

(58) Field of Classification Search
CPC .......... B33Y 10/00; B33Y 80/00; B23K 1/00; B23K 33/00; B23K 9/23; B23K 9/007;
(Continued)

(56) References Cited

U.S. PATENT DOCUMENTS

| | | | | |
|---|---|---|---|---|
| 4,359,599 A | * | 11/1982 | Benner | .................. H01R 4/029 |
| | | | | 219/127 |
| 7,700,198 B2 | * | 4/2010 | Takeda | ................... B23K 9/232 |
| | | | | 428/653 |

(Continued)

FOREIGN PATENT DOCUMENTS

| | | | |
|---|---|---|---|
| CN | 2851686 Y | 12/2006 | |
| CN | 201526798 U | 7/2010 | |

(Continued)

OTHER PUBLICATIONS

Machine English Translation of DE-102012013325-A1 (Year: 2014).*

(Continued)

*Primary Examiner* — Edward F Landrum
*Assistant Examiner* — Erwin J Wunderlich
(74) *Attorney, Agent, or Firm* — Crowell & Moring LLP

(57) ABSTRACT

A method for joining a first component to a second component includes providing a first component with a first joining part receiving section and creating a joining part on and/or in the first joining part receiving section via a generative method. The method also includes providing a second component with a second joining part receiving section, and joining the joining part to the second joining part receiving section of the second component.

12 Claims, 6 Drawing Sheets

(51) Int. Cl.

| | |
|---|---|
| *B23K 11/00* | (2006.01) |
| *B23K 11/11* | (2006.01) |
| *B23K 20/12* | (2006.01) |
| *B23K 26/21* | (2014.01) |
| *B23K 26/34* | (2014.01) |
| *B23K 26/354* | (2014.01) |
| *B23K 35/02* | (2006.01) |
| *B29C 65/00* | (2006.01) |
| *B29C 65/02* | (2006.01) |
| *B29C 65/48* | (2006.01) |
| *B29C 65/56* | (2006.01) |
| *B33Y 80/00* | (2015.01) |
| *B21J 15/02* | (2006.01) |

(52) U.S. Cl.
  CPC ............. *B23K 26/21* (2015.10); *B23K 26/34* (2013.01); *B23K 26/354* (2015.10); *B33Y 80/00* (2014.12); *B21J 15/025* (2013.01); *B23K 11/115* (2013.01); *B23K 20/1295* (2013.01); *B23K 35/0288* (2013.01); *B29C 65/02* (2013.01); *B29C 65/48* (2013.01); *B29C 65/56* (2013.01); *B29C 65/565* (2013.01); *B29C 66/1122* (2013.01)

(58) Field of Classification Search
  CPC ......... B23K 26/00; B23K 1/19; B23K 26/21; B23K 26/34; B23K 26/354; B23K 11/0053; B23K 11/115; B23K 20/1295; B23K 35/0288; F16B 5/08; B29C 65/02; B29C 65/48; B29C 65/56; B29C 65/564; B29C 65/565; B29C 66/1122; B29C 66/21; B29C 66/41; B29C 66/721; B21J 15/025
  See application file for complete search history.

(56)                References Cited

U.S. PATENT DOCUMENTS

| | | | | |
|---|---|---|---|---|
| 8,066,173 | B2 * | 11/2011 | Clark ................... | B23K 1/0018 |
| | | | | 228/114.5 |
| 9,683,682 | B2 * | 6/2017 | Narayanan ............. | B23K 26/24 |
| 10,384,295 | B2 * | 8/2019 | Draht ................. | B23K 11/0053 |
| 10,543,549 | B2 * | 1/2020 | Albrecht ................ | B23K 31/02 |
| 10,603,737 | B2 * | 3/2020 | Mizobata ............. | B23K 26/211 |
| 10,702,913 | B2 * | 7/2020 | Hartwig-Biglau ........ | F16B 5/08 |
| 2004/0238510 | A1 * | 12/2004 | Mielke ................. | F16B 37/061 |
| | | | | 219/129 |
| 2011/0097142 | A1 * | 4/2011 | Bassler ................... | F16D 1/068 |
| | | | | 403/337 |
| 2012/0308332 | A1 | 12/2012 | Jackson | |

| | | | | |
|---|---|---|---|---|
| 2013/0112664 | A1 * | 5/2013 | Erlacher ................. | B21J 15/08 |
| | | | | 219/78.01 |
| 2013/0270229 | A1 * | 10/2013 | Pedersen ............... | B23K 11/36 |
| | | | | 29/524.1 |
| 2013/0309000 | A1 * | 11/2013 | Lin ..................... | B23K 26/0652 |
| | | | | 219/121.64 |
| 2014/0174669 | A1 * | 6/2014 | Zebisch ................. | B21J 15/027 |
| | | | | 156/580 |
| 2014/0356101 | A1 * | 12/2014 | Bassler ................. | B23K 11/14 |
| | | | | 411/506 |
| 2015/0021379 | A1 * | 1/2015 | Albrecht .................. | B05B 7/22 |
| | | | | 219/76.1 |
| 2015/0144602 | A1 * | 5/2015 | Draht .................... | B23K 20/02 |
| | | | | 228/141.1 |
| 2015/0300389 | A1 | 10/2015 | Mayer et al. | |
| 2016/0362144 | A1 * | 12/2016 | Potthast ................ | B23K 31/02 |
| 2020/0276663 | A1 * | 9/2020 | Wang .................... | B23K 3/087 |

FOREIGN PATENT DOCUMENTS

| | | | | |
|---|---|---|---|---|
| CN | 103878476 A | | 6/2014 | |
| CN | 103925267 A | | 7/2014 | |
| CN | 104854354 A | | 8/2015 | |
| DE | 102010020569 A1 * | 11/2011 | .......... B23K 11/002 |
| DE | 102010026040 A1 * | 1/2012 | .......... B23K 1/0004 |
| DE | 102011109805 B3 * | 1/2013 | .......... B21J 15/027 |
| DE | 10 2012 016 309 A1 | 2/2014 | |
| DE | 102012013325 A1 * | 10/2014 | ............. B21J 15/02 |
| JP | 2013-22622 A | 2/2013 | |
| JP | 2013022622 A * | 2/2013 | |
| WO | WO-2013020659 A1 * | 2/2013 | .......... B21J 15/027 |
| WO | WO 2013/124691 A1 | 8/2013 | |

OTHER PUBLICATIONS

Machine English Translation of DE-102010020569-A1 (Year: 2011).*
Machine English Translation of DE-102010026040-A1 (Year: 2012).*
Machine English Translation of WO-2013020659-A1 (Year: 2013).*
Machine English translation of DE-102011109805-B3 (Year: 2013).*
English Translation of Chinese-language Office Action issued in Chinese Application No. 201680037734.4 dated Mar. 30, 2020 seven (7) pages).
International Search Report (PCT/ISA/210) issued in PCT Application No. PCT/EP2016/073115 dated Nov. 28, 2016 with English translation (Four (4) pages).
German-language Written Opinion (PCT/ISA/237) issued in PCT Application No. PCT/EP2016/073115 dated Nov. 28, 2016 (Four (4) pages).
German-language Search Report issued in counterpart German Application No. 10 2015 219 782.4 dated Jun. 20, 2016 with partial English translation (Twelve (12) pages).
Chinese-language Office Action issued in counterpart Chinese Application No. 201680037734.4 dated Feb. 1, 2019 with English translation (14 pages).

* cited by examiner

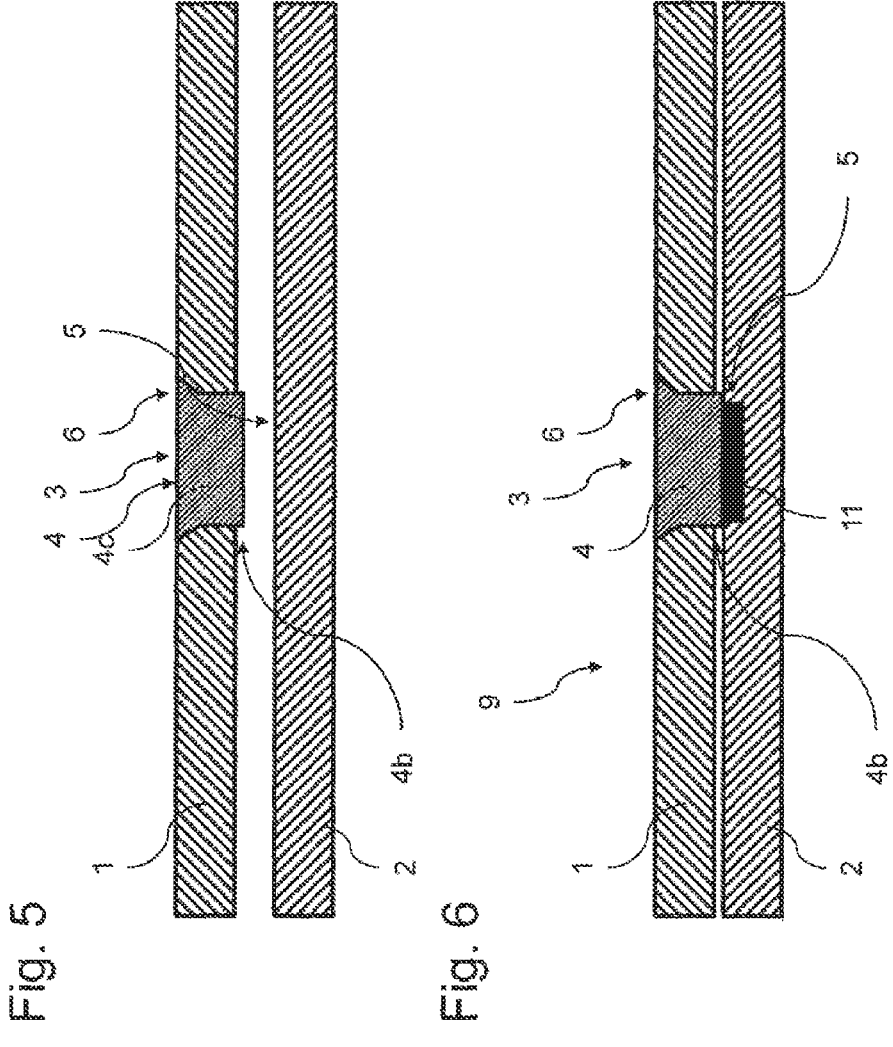

METHOD FOR JOINING COMPONENTS AND COMPONENT COMPOSITE

CROSS REFERENCE TO RELATED APPLICATIONS

This application is a continuation of PCT International Application No. PCT/EP2016/073115, filed Sep. 28, 2016, which claims priority under 35 U.S.C. § 119 from German Patent Application No. 10 2015 219 782.4, filed Oct. 13, 2015, the entire disclosures of which are herein expressly incorporated by reference.

BACKGROUND AND SUMMARY OF THE INVENTION

Embodiments of the present invention relate to a method for joining a first component to a second component by means of a joining part, as well as a component composite which was produced by means of a method according to the invention.

Different joining methods exist for the joining of two components, such as screwing, riveting, adhesive bonding, soldering, welding, or clamping. In bodywork production, bodywork components are used which may include different materials, such as steel, aluminum, or fiber-reinforced plastics, such as carbon fiber-reinforced plastic (CFK), aramid fiber-reinforced plastic (AFK) or fiberglass-reinforced plastic (GFK). These bodywork components are joined together via blind rivet techniques, punched rivet techniques, adhesive bonding techniques or other joining part techniques, for example. Such methods, however, have the drawback that the joint locations produced often have a relatively poor load bearing ability and poor joint cushioning, and the poor joint cushioning may have a negative impact on vibration properties of the bodywork.

A direct welding of two bodywork components consisting of different materials, such as steel and aluminum, is often not possible or is possible only under special preconditions or to a limited extent. Methods exist for the welding of such components in which a functional element comprising a material which can be welded to a second component is secured to a first component. For example, the functional element is formed as a bolt, which is fitted into a recess of the first component. After this, the first component and the second component are brought together and the functional element is welded to the second component. In this way, a connection is created between the first component and the second component. Such connections, however, have the drawback that the connection of the functional element to the first component has a relatively poor load bearing ability and a poor joint cushioning. Moreover, the introducing of functional elements via pressing is very expensive and costly. Furthermore, such solutions often lead to an excessive weight increase of the composite component.

Therefore, one problem which the embodiment of the present invention propose to solve is to eliminate or at least partly eliminate the above-described drawbacks in a method for joining two components, as well as a composite component. In particular, the embodiments of the present invention seek to provide a method for joining a first component to a second component that make it possible to reduce weight, while achieving a stronger connection of two components, when compared to the identified prior art. Further the inventive method achieves these objectives in a simple and cost-effective manner.

The above problems are solved by the inventive method for joining a first component to a second component, and also by the inventive composite component disclosed in this application. Further features and details of the embodiments of the invention will emerge from the dependent claims, the specification and the drawings. Features and details which are described in connection with the method for joining a first component to a second component also of course apply in connection with the composite component according to the embodiments of the invention and vice versa, so that a mutual referencing is or may always be done in regard to the disclosure of the individual aspects of the embodiments of the invention.

According to an aspect of the invention, the problem is solved by a method for joining a first component to a second component. The method involves providing a first component with a first joining part receiving section, creating a joining part on and/or in the first joining part receiving section by means of a generative method, providing a second component with a second joining part receiving section, and joining the joining part to the second joining part receiving section of the second component.

The first component has a joining part receiving section. The second component has a second joining part receiving section, which for example corresponds to the first joining part receiving section or may also have a different configuration from the first joining part receiving section. A joining part receiving section is a region of a component which is configured for receiving a joining part. Accordingly, a joining part receiving section can have practically any geometrical shape, such as a smooth or substantially smooth surface and/or at least one shoulder or a step and/or at least one cavity or eminence.

As used herein a joining part means an object with a geometrical shape which is designed for the joining of two components. Thus, the first component may be connected to the second component by the joining part.

The joining part is created by means of a generative method. A generative method is a method in which an object is created by depositing material, especially by depositing material in layers. By means of a generative method, practically any desired geometrical configuration of the joining part can be produced, so that the joining part is optimally adaptable to the first component and/or the second component. Moreover, in generative methods a variety of different joining parts with different joining part materials can be produced, so that a joining part material can be optimally coordinated with a first component material of the first component and/or a second component material of the second component, in order to ensure the most secure and strong connection of the first component to the second component by the joining part.

The joining part is created on and/or in the first joining part receiving section. This is dependent, among other things, on a configuration of the first joining part receiving section. Thus, it may be provided that the joining part is created in a cavity of the first joining part receiving section. Moreover, it may be provided that the joining part is created such that it protrudes at least in one direction from the first component. Moreover, it may be provided that the joining part is created such that the joining part has an orienting aid, which facilitates a relative orienting of the first component with the second component. The orienting aid may be designed, for example, as a spacer, so that the first component and the second component have a given spacing from each other during and after being joined together.

For the joining of the joining part to the second joining part receiving section, it is provided that the first component and the second component are arranged with a certain relative position to each other, which the first component and the second component are intended to have after being joined together. This relative position is designated hereinafter as the joining position. It may be provided that the first component and the second component are brought into the joining position already before creating the joining part and are preferably temporarily secured in the joining position. The possibility of carrying out such a method may depend on a configuration of the first joining part receiving section and/or the second joining part receiving section, especially when the creating of the joining part requires accessibility to the first joining part receiving section and the second joining part receiving section from the outside. Alternatively, it may be provided that the joining part is at first created on the first component and then the first component and the second component are brought into the joining position. This may be required when a configuration of the first joining part receiving section and/or second joining part receiving section does not allow for a partial or complete creating of the joining part in the joining position. A connection of the joining part to the second joining part receiving section may be integrally bonded and/or form fitting and/or force locking in configuration, for example.

The inventive method for joining a first component to a second component has the advantage over traditional methods that a particularly strong and weight-reduced connection between two components is made possible by means of a joining part with simple means and cost-effectively.

The joining part may be welded and/or soldered and/or adhesively bonded to the second joining part receiving section during the connection to the second joining part receiving section. For this, the joining part preferably has a joining part material which is especially easily weldable and/or solderable and/or adhesively bondable to a second component material of the second component. It is preferable for the joining part material to correspond to the second component material. This has the advantage that a connection between the joining part and the second component can be produced with simple means and cost-effectively. Moreover, a load bearing ability of a connection of the joining part to the second component is improved in this way.

The joining part may be welded and/or soldered and/or adhesively bonded to the first joining part receiving section. This has the advantage that a connection between the joining part and the first component can be produced with simple means and cost-effectively. Moreover, a load bearing ability of a connection of the joining part to the first component is improved in this way, so that it is possible in this way for example to prevent a detachment of the joining part from the first component prior to the connection to the second component.

The joining part may be created from a joining part material which comprises at least a first material and a second material different from the first material, in which the first material is integrally bonded to the first component and the second material is integrally bonded to the second component. Preferably, the joining part has a material distribution in which a first partial region of the joining part which is arranged on the first component has a higher concentration of the first material and a second partial region of the joining part which is configured for arrangement on the second component has a higher concentration of the second material. The first material in this case is especially easily joinable to the first component material and the second material is especially easily joinable to the second component material. Such a joining part has the advantage that a load bearing ability of a connection with the first component and the second component can be improved.

The joining part may be created by means of a 3D printing process, a laser sintering process, a metal spray process, a selective laser melting process, a soldering process or a thixoforming process. Such generative methods have the advantage of being technically realizable with simple means. Moreover, many different joining part materials can be processed into joining parts with these methods.

During the creating of the joining part, an integrally bonded or force locking connection of the joining part with the first component and/or second component may be formed. Integrally bonded connections have the advantage of being especially strong and having an advantageous joint cushioning. Force locking connections have the advantage of being able to be more easily dismantled than integrally bonded connections.

The first joining part receiving section may include a first form fitting section, in which the joining part is created in the first joining part receiving section such that the joining part is held by form fit by the first form fitting section on the first joining part receiving section. A form fitting section is formed for example as a step, shoulder, or bevel and may have for example an undercut. Preferably, the first form fitting section is formed such that the joining part does not protrude from the first component in the region of the form fitting section, but instead is recessed in the first joining part receiving section or terminates flush with the first component. It is preferable here for the joining part to be secured by form fit in each case against slipping off from the first component and the second component, e.g., by an encircling bevel in the first joining part receiving section and the second joining part receiving section. A form fitting section has the advantage that a relative movement of the joining part with respect to the first component is limited by form fitting. Thus, the joining part at least after being connected to the second component is also secured against detachment from the first component.

The first form fitting section may include a first undercut, in which the joining part is created such that the joining part is held by form fit on the first undercut. Preferably, the second joining part has a second form fitting section, in which the second form fitting section preferably includes a second undercut. An additional partial region of the joining part may be created such that the joining part is also held by form fit on the second undercut. The holding of the joining part on the first or second component is improved by means of a first undercut and possibly an additional second undercut, respectively.

The first joining part receiving section may include a first bushing. The joining part may then be preferably at least partly created inside the first bushing. A first form fitting section is preferably arranged inside the first bushing. A bushing has the advantage that a creating of the joining part and a form fitting attachability of the joining part to the first component can be realized with simple means and cost-effectively.

The first bushing may be entirely or at least partly closed by the joining part when creating the joining part. A complete closure may be a closure at least at one region over an entire cross section of the first bushing or a filling up of the entire first bushing. This has the advantage that no direct connection of two opposite component sides of the first component is created through the bushing. Moreover, the holding of the joining part on the first component can thus be improved.

The first component may have a first component material and the second component has a second component material, the first component material and the second component material being different materials. Preferably, the first component material and the second component material are so different that a direct welding together and/or soldering together and/or adhesive bonding together of the first component with the second component is not possible or at least only possible with difficulty or to a limited extent. Preferred component materials are steel, aluminum, CFK, AFK and GFK. In particular, such different components can be easily joined together, with improved load bearing ability, weight, and material expense for the connection as compared to the prior art.

The connecting of the joining part to the second joining part receiving section may be done by creating an additional partial region of the joining part, namely an additional region, in the second joining part receiving section via the generative method. This embodiment of the method according to the invention may be done, for example, in many variants. For example, the first component and the second component may be brought into the joining position and the joining part may be created in a subsequent generative method from the first joining part receiving section to the second joining part receiving section and thus the first component is connected to the second component in one step of the method. Alternatively, a base region of the joining part may at first be created on and/or in the first joining part receiving section in a first generating step. This base region is already called a joining part. Subsequently, the first component and the second component are brought into the joining position. Subsequently, the additional region is created on the joining part such that the base region and the additional region form a common joining part, and the first component and the second component are connected together by this joining part. Thus, the inventive method has the advantage that no further joining methods such as welding, soldering or adhesive bonding are required. Thus, for example, cycle times, refitting times, costs and machine expenditure of the method can be reduced by simple means.

Additionally, when providing a second component, the second joining part receiving section is arranged on the joining part such that the joining part protrudes into the second joining part receiving section. This has the advantage of improving the connecting of the joining part to the second component.

Additionally, when creating the joining part, a partial region of the joining part is created as a spacing region, which is formed in order to form a defined spacing between the first component and the second component. This may be done, for example, by creating a spacing region of the joining part at a place of the first joining part receiving section which is turned toward the second component in the joining position. This spacing region is preferably created before the second component is brought into the joining position. Further, the spacing region is designed as a spacer and/or centering aid, which carries out and thus improves the arranging of the first component or second component in the joining position. Moreover, it is thus possible to avoid the first component and the second component being accidentally dislodged from the joining position prior to the connecting.

The components to be connected are preferably bodywork components, especially of a motor vehicle.

Additionally, the problems in the art are solved by a component composite having at least a first component and at least a second component, in which the first component is connected to the second component by means of a joining part. The first component and the second component are joined together via the inventive method. The described component composite provides all the benefits which have already been described for a method for joining a first component and a second component according to the invention.

Other objects, advantages and novel features of the embodiments of the present invention will become apparent from the following detailed description of one or more preferred embodiments when considered in conjunction with the accompanying drawings, in which:

BRIEF DESCRIPTION OF THE DRAWINGS

FIG. 5 shows, in a cross section representation, the inventive first component of FIG. 4B after a third method step;

FIG. 6 shows, in a cross section representation, the inventive first component and second component of FIG. 5 after a fourth method step;

DETAILED DESCRIPTION OF THE DRAWINGS

Elements with the same function and mode of operation are each time given the same reference numbers in FIGS. 1 to 8.

Figures 1, 2:
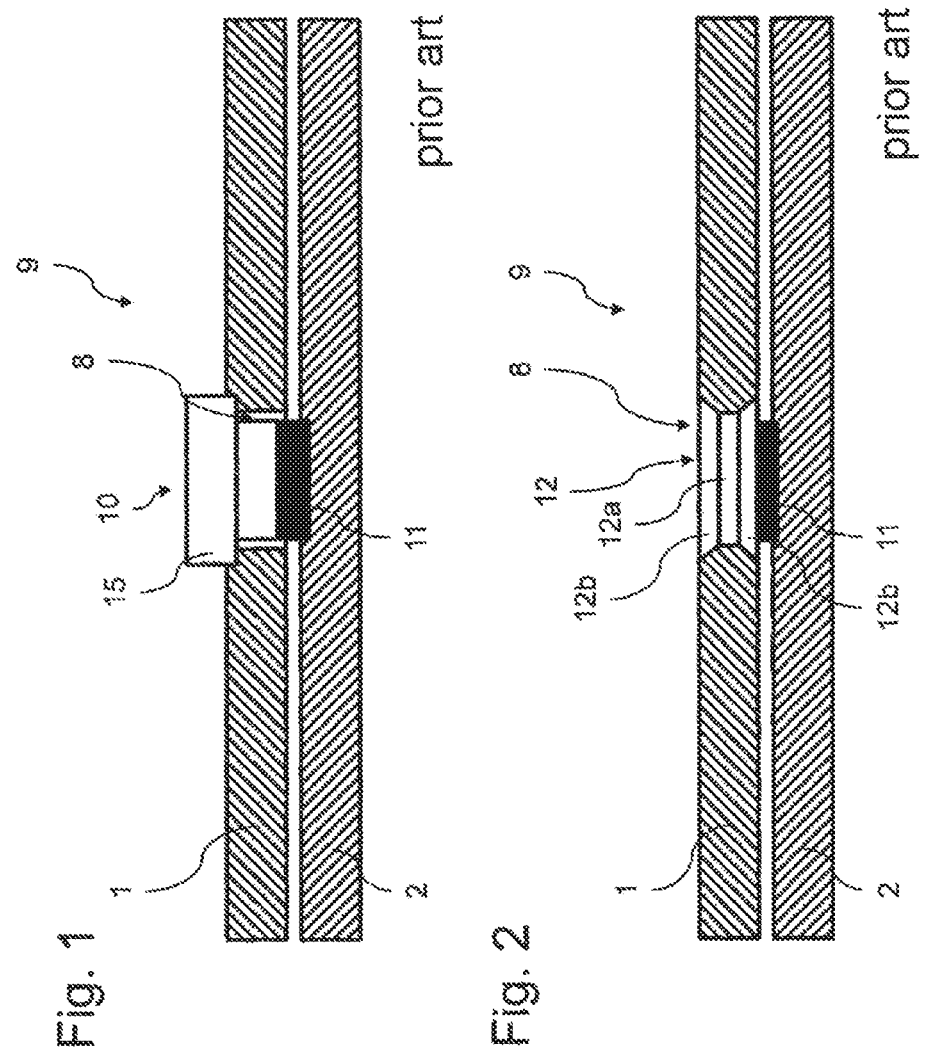
FIG. 1 shows, in a cross section representation, a first component composite according to the prior art.
FIG. 2 shows, in a cross section representation, a second component composite according to the prior art.

FIG. 1 shows a first composite component 9 according to the prior art in schematic representation. A first component 1 and second component 2 are arranged in a joining position relative to each other. A bolt 10 with a bolt head 15 is pressed into a first bushing 8 of the first component 1. The bolt head 15 lies against a surface of the first component 1 and thus prevents the bolt 10 from being able to move further into the first bushing 8. An end of the bolt 10 away from the bolt head 15 is connected by means of a welded seam 11 to the second component 2.

FIG. 2 shows a second composite component 9 according to the prior art in schematic representation. A first component 1 and second component 2 are arranged in a joining position relative to each other. A slug 12 with a cylindrical middle piece 12a and two side pieces 12b broadening conically from the middle piece is pressed into a first bushing 8 of the first component 1. The slug 12 is thus held by form fit in the bushing 8 of the first component 1. One side piece 12*b* of the slug 12 is connected by means of a welded seam 11 to the second component 2.

Figures 3A, 3B:
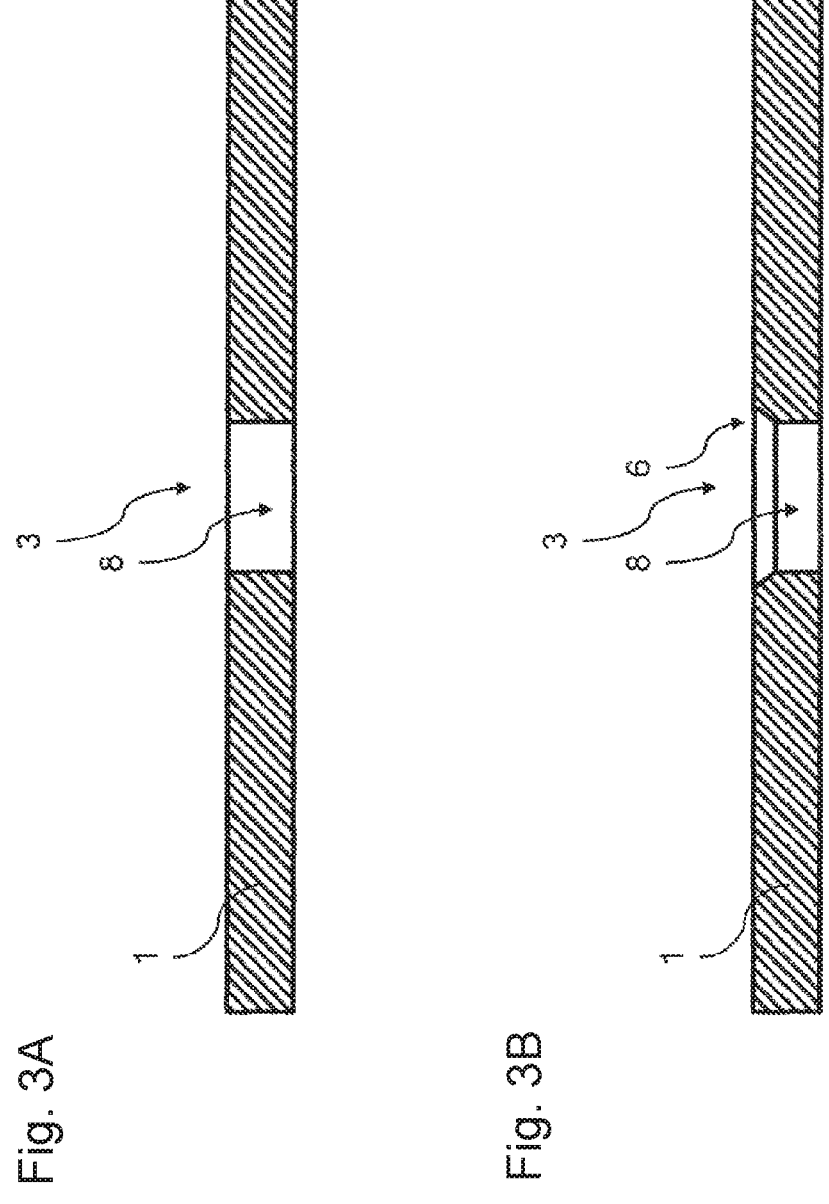
FIG. 3A shows, in a cross section representation, the inventive first component.
FIG. 3B shows, in a cross section representation, the inventive first component.

FIG. 3A shows, in schematic representation, a first component 1 after the first method step. The first component 1 has a first joining part receiving section 3, formed as a bushing 8. The bushing 8 preferably has a circular cross section and is preferably formed as a borehole or punched hole.

FIG. 3B shows, in schematic representation, the first component 1 after the first method step. The embodiment of FIG. 3B differs from the embodiment of FIG. 3A in that a first form fitting section 6 is arranged at one end of the bushing 8, fashioned as a bevel.

Figures 3C, 3D:
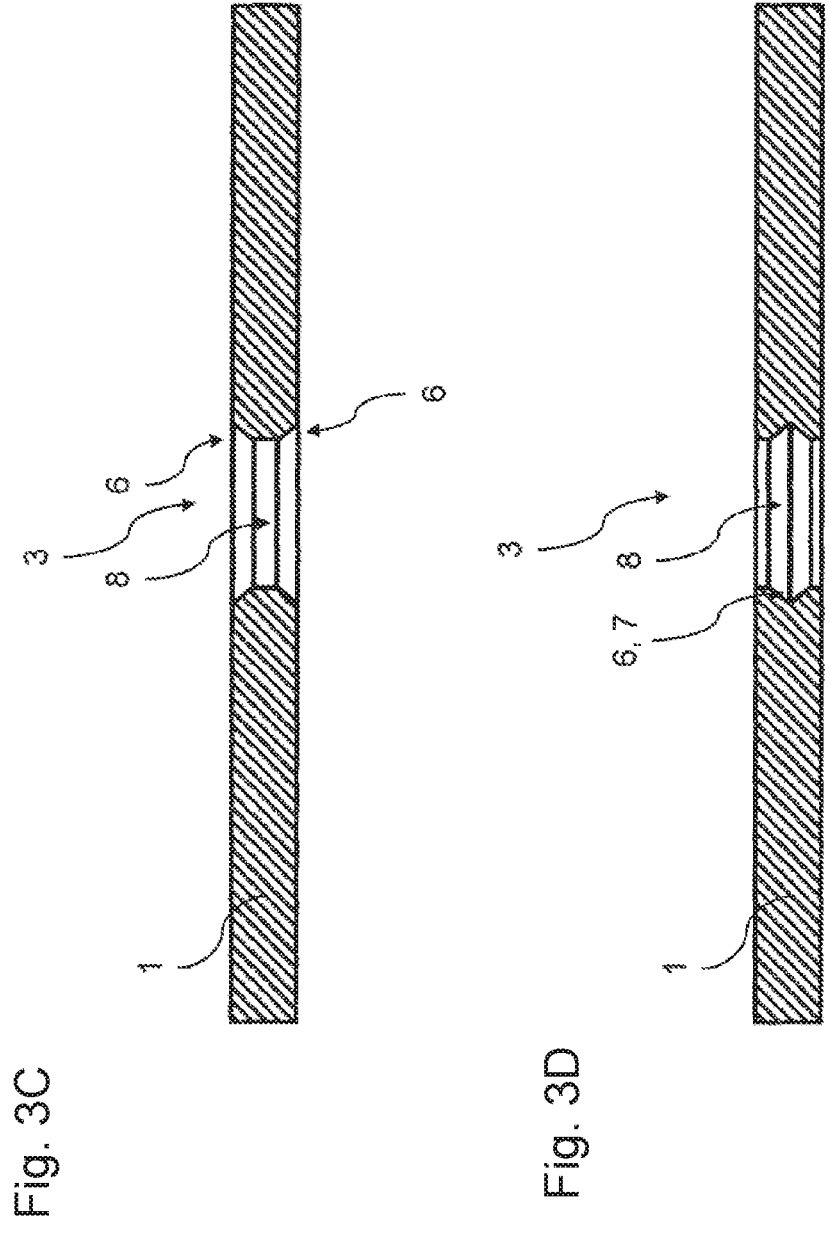
FIG. 3C shows, in a cross section representation, the inventive first component.
FIG. 3D shows, in a cross section representation, the inventive first component.

FIG. 3C shows, in schematic representation, the first component 1 after the first method step. The embodiment of FIG. 3C differs from the embodiment of FIG. 3B in that a first form fitting section 6 is arranged at both ends of the bushing 8, fashioned as a bevel.

FIG. 3D shows, in schematic representation, the first component 1 after the first method step. The first joining part receiving section 3 comprises a first bushing 8. In a middle region of the bushing 8 there is arranged a first form fitting section 6, which is formed as an undercut 7 composed of two bevels.

Figures 4A, 4B:
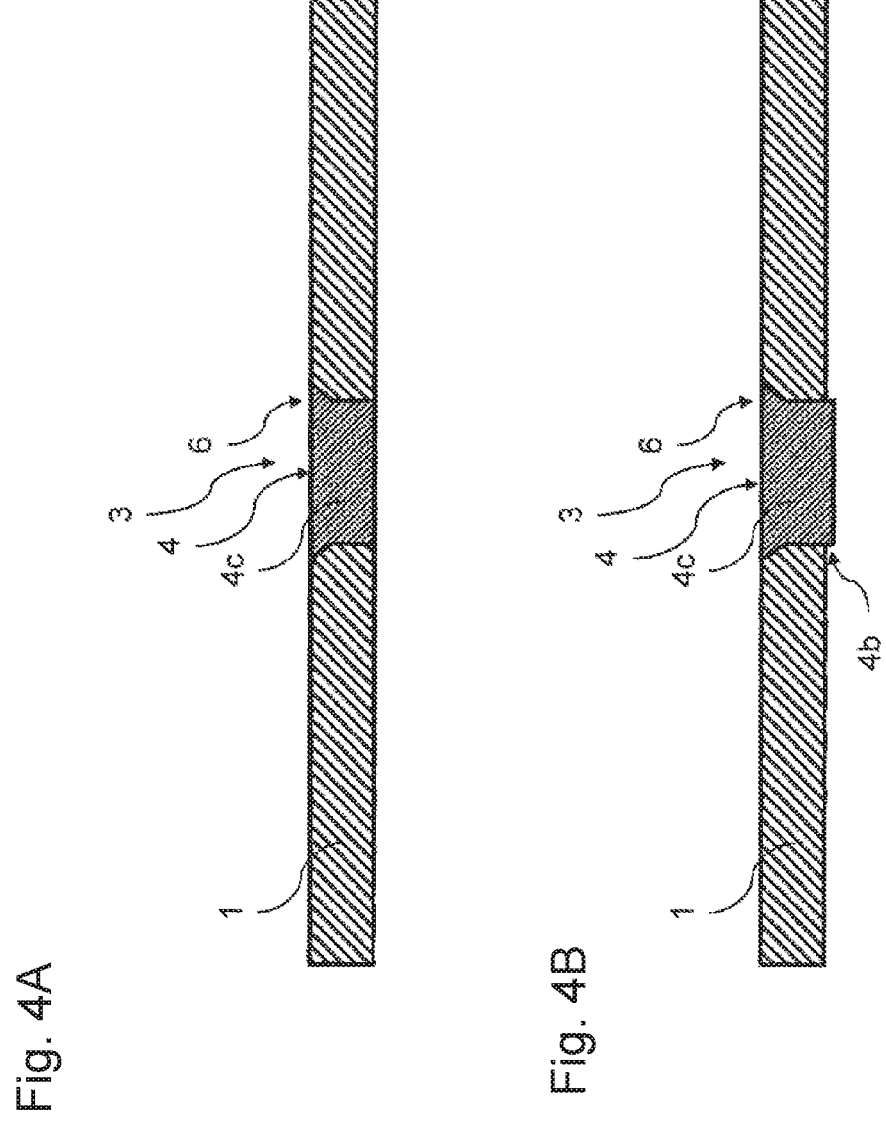
FIG. 4A shows, in a cross section representation, the inventive first component.
FIG. 4B shows, in a cross section representation, the inventive first component.

FIG. 4A shows the first component 1 of FIG. 3B after a first variant of a second method step. In the first joining part receiving section 3 there is arranged a base region 4*c* of a joining part 4, which was created at this place in the second method step. The joining part 4 is form fitted and preferably integrally bonded on the first form fitting section 6 to prevent a downward movement in this view. Further, it may be additionally provided that the joining part 4 protrudes upward from the first component 1 at an upward facing end in this representation.

FIG. 4B shows the first component 1 of FIG. 3B after a second variant of the second method step. The joining part 4 according to FIG. 4B differs from that of FIG. 4A in that the joining part 4 comprises a spacing region 4*b*, which extends away from the first component 1 in a direction in which the second component 2 is arranged in the joining position. Additionally, it may be provided in addition that the joining part 4 protrudes upward from the first component 1 at an upward facing end in this representation.

FIG. 5 shows, in schematic representation, the first component 1 of FIG. 4B together with a second component 2. The first component 1 and the second component 2 are not yet arranged in the joining position. The spacing region 4*b* of the joining part 4 is facing a second joining part receiving section 5.

FIG. 6 shows the situation of FIG. 5 after a fourth method step, in schematic representation. The first component 1 and the second component 2 are arranged in the joining position. A spacing between the first component 1 and the second component 2 is established by the spacing region 4*b* of the joining part 4. The spacing region 4*b* is connected by means of a welded seam 11 to the second joining part receiving section 5 of the second component 2. Thus, the first component 1 is joined by the joining part 4 to the second component 2 and thus forms a component composite 9 with the second component 2 as well as the joining part 4.

Figures 7, 8:
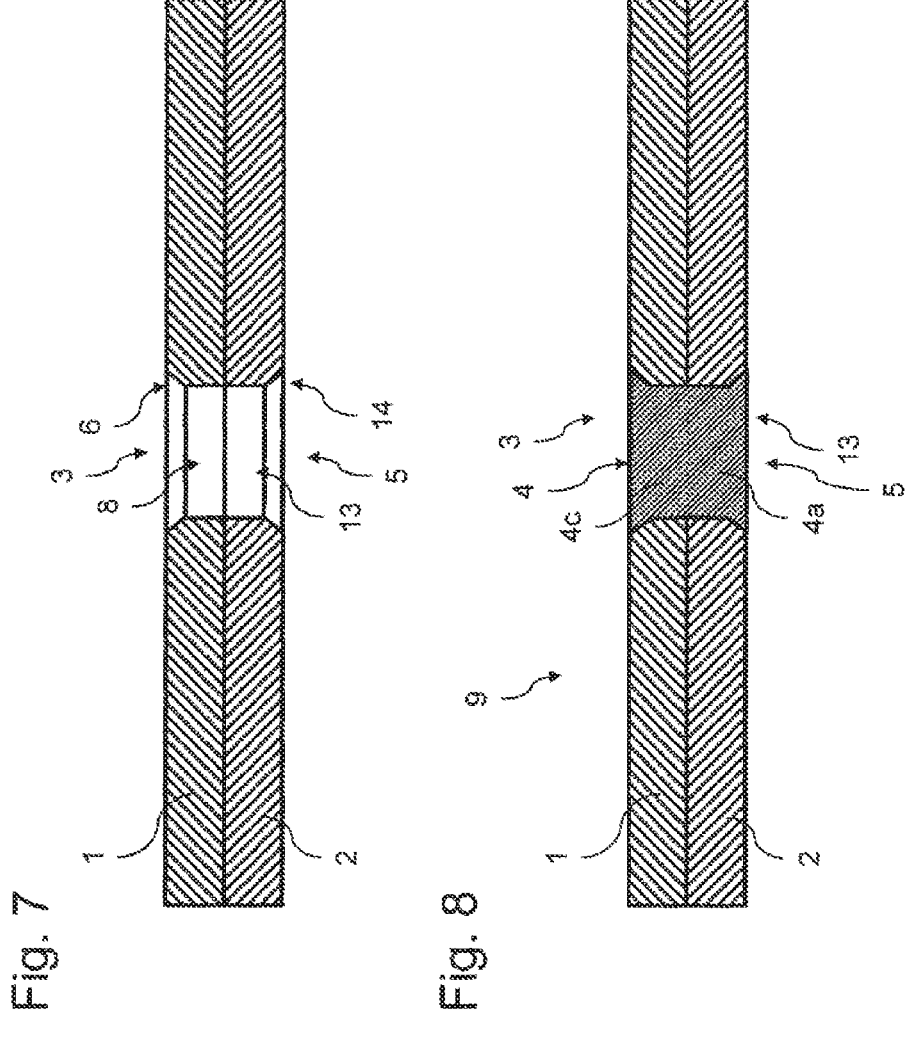
FIG. 7 shows, in a cross section representation, the inventive method before creating the joining part.
FIG. 8 shows, in a cross section representation, the inventive method after creating the joining part.

FIG. 7 shows the inventive method before creating the joining part 4. The first component 1 is formed according to FIG. 3B. The second joining part receiving section 5 of the second component 2 is a mirror image of the first joining part receiving section 3 of the first component 1 and comprises a second bushing 13 as well as a second form fitting section 14 configured as a bevel. The first form fitting section 6 and the second form fitting section 14 face away from each other. Alternatively, it may be provided that the second joining part receiving section 5 has, for example, a smaller or larger diameter than the first joining part receiving section 3. Moreover, it may be provided that the second joining part receiving section 5 has a different shape from the first joining part receiving section, such as a shape known from FIG. 3A to FIG. 4D. The first component 1 and the second component 2 are represented in the joining position, no gap being formed between the first component 1 and the second component 2 in the joining position of this example.

FIG. 8 shows a variant of FIG. 7 after creating the joining part 4. A base region 4*c* of the joining part 4 is arranged in the first bushing 8 of the first joining part receiving section 4 and an additional region 4*a* of the joining part 4 is arranged in the second bushing 13 of the second joining part receiving section 5. Thus, the first component 1 is connected by the joining part 4 to the second component 2 and thus forms a component composite 9 with the second component 2 as well as the joining part 4.

LIST OF REFERENCE NUMBERS

1 first component
2 second component
3 first joining part receiving section
4 joining part
4*a* additional region
4*b* spacing region
4*c* base region
5 second joining part receiving section
6 first form fitting section
7 first undercut
8 first bushing
9 component composite
10 bolt
11 welded seam
12 slug
12*a* middle piece
12*b* side piece
13 second bushing
14 second form fitting section
15 bolt head The foregoing disclosure has been set forth merely to illustrate the embodiments of the invention and is not intended to be limiting. Since modifications of the disclosed embodiments incorporating the spirit and substance of the invention may occur to persons skilled in the art, the embodiments of the invention should be construed to include everything within the scope of the appended claims and equivalents thereof.

What is claimed is:

1. A method for joining a first component to a second component, the method comprising the acts of:

a first step of providing the first component with a first joining part receiving section;

after the first step, a second step of creating a joining part on and/or in the first joining part receiving section using a generative manufacturing method that deposits material in layers, wherein the joining part comprises an orienting aid which facilitates a relative orienting of the first component with the second component;

after the second step, a third step of providing the second component with a second joining part receiving section;

after the third step, a fourth step of creating an additional region of the joining part in the second joining part receiving section using the generative manufacturing method that deposits material in layers; and after the fourth step, a fifth step of connecting the joining part on and/or in the first joining part receiving section to the second joining part receiving section at the additional region in the second joining part, wherein the generative manufacturing method that deposits material in layers is one of a 3D printing process, a laser sintering process, a metal spray process, a selective laser melting process, a soldering process or a thixoforming process.

2. The method as claimed in claim 1, wherein the joining part is welded and/or soldered and/or adhesively bonded to the second joining part receiving section during the connection to the second joining part receiving section.

3. The method as claimed in claim 2, wherein the joining part is welded and/or soldered and/or adhesively bonded to the first joining part receiving section.

4. The method as claimed in claim 3, wherein the joining part is created from a joining part material which comprises at least a first material and a second material different from the first material, wherein the first material is integrally bonded to the first component and the second material is integrally bonded to the second component.

5. The method as claimed in claim 1, wherein during the creating of the joining part, an integrally bonded or force locking connection of the joining part with the first component and/or second component is formed.

6. The method as claimed in claim 5, wherein the joining part is created in the first joining part receiving section such that the joining part is held by form fit by a first form fitting section on the first joining part receiving section.

7. The method as claimed in claim 6, wherein the first form fitting section comprises a first undercut, wherein the joining part is created such that the joining part is held by form fit on the first undercut.

8. The method as claimed in claim 1, wherein the first joining part receiving section comprises a first bushing.

9. The method as claimed in claim 8, wherein the first bushing is entirely or at least partly closed by the joining part when creating the joining part.

10. The method as claimed in claim 9, wherein the first component has a first component material and the second component has a second component material, the first component material and the second component material being different materials.

11. The method as claimed in claim 1, wherein when providing the second component, the second joining part receiving section is arranged on the joining part such that the joining part protrudes into the second joining part receiving section.

12. The method as claimed in claim 11, wherein when creating the joining part, a spacing region of the joining part is created, which is formed in order to form a defined spacing between the first component and the second component.

* * * * *